US011838426B2

(12) United States Patent
Wright

(10) Patent No.: US 11,838,426 B2
(45) Date of Patent: Dec. 5, 2023

(54) COMPUTER IMPLEMENTED METHOD AND SYSTEM FOR OBTAINING DIGITALLY SIGNED DATA

(71) Applicant: nChain Licensing AG, Zug (CH)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 42 days.

(21) Appl. No.: 16/962,800

(22) PCT Filed: Jan. 10, 2019

(86) PCT No.: PCT/IB2019/050178
§ 371 (c)(1),
(2) Date: Jul. 16, 2020

(87) PCT Pub. No.: WO2019/142075
PCT Pub. Date: Jul. 25, 2019

(65) Prior Publication Data
US 2021/0377050 A1 Dec. 2, 2021

(30) Foreign Application Priority Data

Jan. 16, 2018 (GB) ...................................... 1800706
Jan. 16, 2018 (WO) .................. PCT/IB2018/050264

(51) Int. Cl.
*H04L 9/32* (2006.01)
*H04L 9/08* (2006.01)
(Continued)

(52) U.S. Cl.
CPC ............ *H04L 9/3252* (2013.01); *H04L 9/085* (2013.01); *H04L 9/3066* (2013.01);
(Continued)

(58) Field of Classification Search
None
See application file for complete search history.

(56) References Cited

U.S. PATENT DOCUMENTS 9,049,011 B1\* 6/2015 Agrawal ............... H04L 9/0894
9,753,964 B1\* 9/2017 Marshall ........... G06F 18/24137
(Continued)

FOREIGN PATENT DOCUMENTS

CN 106127079 A 11/2016

OTHER PUBLICATIONS

Gennaro et. al., International Conference on the Theory and Applications of Cryptographic Techniques EUROCRYPT 1996: Advances in Cryptology—EUROCRYPT 1996 pp. 354-371 (Year: 1996).\*
(Continued)

*Primary Examiner* — Bassam A Noaman
(74) *Attorney, Agent, or Firm* — Davis Wright Tremaine LLP

(57) ABSTRACT

A method of obtaining digitally signed data is disclosed. The method comprises sending first data ($e_2$) from at least one of a plurality of first participants to at least one second participant, wherein the first data is based on second data (e) accessible to at least one said first participant, and the second data is inaccessible to the or each said second participant. A digital signature ($s_1$) of the first data is received from at least one said second participant, and the digital signature of the first data is processed, by a plurality of the first participants, to provide shares of a digital signature(s) of the second data, wherein the digital signature of said second data is accessible by means of a threshold number of said shares and is inaccessible to less than said threshold number of shares.

17 Claims, 2 Drawing Sheets

Figure 1:
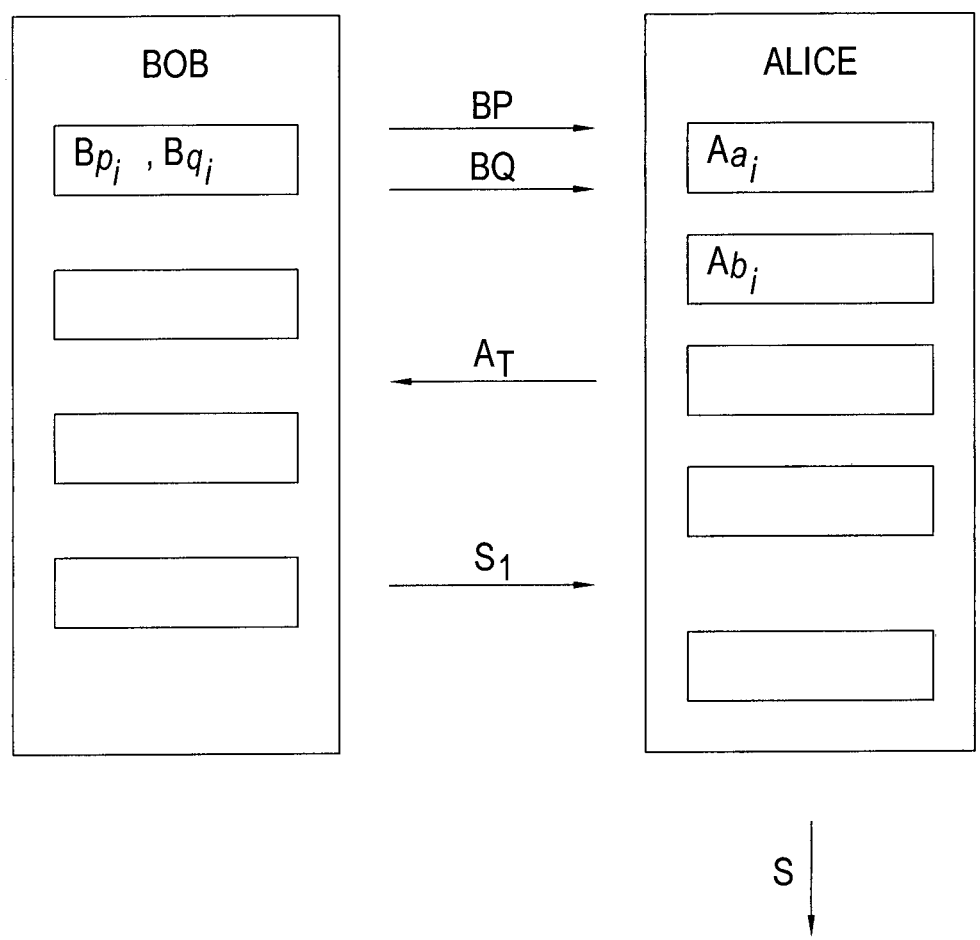

(51) Int. Cl.
H04L 9/30 (2006.01)
H04L 9/00 (2022.01)
(52) U.S. Cl.
CPC .............. H04L 9/3239 (2013.01); H04L 9/50 (2022.05); H04L 2209/16 (2013.01)

(56) References Cited

U.S. PATENT DOCUMENTS

| | | | |
|---|---|---|---|
| 10,050,779 | B2 | 8/2018 | Alness et al. |
| 2004/0139029 | A1 | 7/2004 | Zhang et al. |
| 2007/0192607 | A1 | 8/2007 | Canard et al. |
| 2011/0213975 | A1 | 9/2011 | Sorniotti et al. |
| 2013/0346755 | A1* | 12/2013 | Nguyen ................ H04L 9/3247 713/176 |
| 2017/0063559 | A1 | 3/2017 | Wallrabenstein |
| 2017/0324545 | A1 | 11/2017 | Brandenburger et al. |
| 2017/0339163 | A1* | 11/2017 | Alhothaily ............ H04L 63/108 |
| 2018/0203916 | A1* | 7/2018 | Rafsky .................. G06F 16/285 |
| 2019/0035018 | A1* | 1/2019 | Nolan .................. G06Q 20/401 |
| 2019/0138753 | A1* | 5/2019 | Wallrabenstein ..... H04L 9/0894 |
| 2019/0205125 | A1* | 7/2019 | van Schaik ............. G06F 8/751 |

OTHER PUBLICATIONS

Goldfeder et. al., Securing Bitcoin wallets via threshold signatures, Computer Science, Mathematics, 2014 (Year: 2014).*
"Bitcoin Blind Signatures," GitHub.com, https://github.com/oleganza/bitcoin-papers/blob/master/BitcoinBlindSignatures.md, Jul. 2, 2018, 6 pages.
Andreev, "Bitcoin-Papers," retrieved from https://github.com/oleganza/bitcoin-papers/blob/943eae200e1587db82e5df09c8554a8c944dc043/BitcoinBlindSignatures.md, Mar. 10, 2015, 10 pages.
Antonopoulos, "Mastering Bitcoin—Unlocking Digital Cryptocurrencies," O'Reilly Media, Inc., Dec. 20, 2014, 282 pages.
Bresson et al. "Threshold Ring Signatures and Applications to Ad-hoc Groups," retrieved from http://web.cs.ucdavis.edu/~franklin/ecs289/2010/bresson_etal_2002.pdf, 2002, 24 pages.
Chow et al. "Two Improved Partially Blind Signature Schemes from Bilinear Pairings," retrieved from https://eprint.iacr.org/2004/108.pdf, 2004, 18 pages.
Dahshan et al., "A Threshold Blind Digital Signature Scheme Using Elliptic Curve Dlog-Based Cryptosystem," IEEE 81st Vehicular Technology Conference, 2015, 5 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.

Goldfeder et al., "Securing Bitcoin wallets via threshold signatures," retrieved from http://www.cs.princeton.edu/~stevenag/bitcoin_threshold_signatures.pdf, Jun. 3, 2014, 11 pages.
Green et al., "Strength in Numbers: Threshold ECDSA to Protect Keys in the Cloud," Worcester Polytechnic Institute, retrieved from https://eprint.iacr.org/2015/1169.pdf, 2015, 19 pages.
Heilman et al., "Blindly Signed Contracts: Anonymous On-Blockchain and Off-Blockchain Bitcoin Transactions," International Conference on Financial Cryptography and Data Security, Feb. 22, 2016, 15 pages.
Horster et al. "Blind Multisignature Schemes and Their Relevance to Electronic Voting," University of Technology Chemnitz-Zwickau, Aug. 1995, 9 pages.
Ibrahim et al., "A robust threshold elliptic curve digital signature providing a new verifiable secret sharing scheme," 2003 IEEE 46th Midwest Symposium on Circuits and Systems 1:276-280, Dec. 30, 2003, 6 pages.
International Search Report and Written Opinion for Application No. PCT/IB2019/050178, dated Mar. 14, 2019, filed Jan. 10, 2019.
Jena et al. "A Novel Untraceable Blind Signature Based on Elliptic Curve Discrete Logarithm Problem," International Journal of Computer Science and Network Security, 7(6): Jun. 2007, 7 pages.
Kuchta et al. "Rerandomizable Threshold Blind Signatures," retrieved from https://link.springer.com/chapter/10.1007%2F978-3-319-27998-5_5, 2014, 20 pages.
Maxwell, "IRC Chat Logs," retrieved from https://download.wpsoftware.net/bitcoin/wizards/2014-02-17.html, Feb. 17, 2015, 6 pages.
Maxwell, "Protocol or Paper for Joint Random Secret Sharing," Bitcoin Talk, retrieved from https://bitcointalk.org/index.php?topic=983665.5, Mar. 9, 2015, 3 pages.
Miao et al., "Secure Multi-Server-Aided Data Deduplication in Cloud Computing," Pervasive and Mobile Computing, 2015, 9 pages.
Nakamoto, "Bitcoin: A Peer-to-Peer Electronic Cash System," Bitcoin, Oct. 31, 2008, https://bitcoin.org/bitcoin. pdf, 9 pages.
Oleganza et al. "CoreBitcoin," retrieved from https://github.com/oleganza/CoreBitcoin/blob/master/CoreBitcoin/BTCBlindSignature.m, Dec. 15, 2015, 10 pages.
Satoshi et al., "Connection Limits," Bitcoin Forum, Aug. 9, 2010, https://bitcointalk.org/index.php?topic=741.0;prev_next=prev, 2 pages.
Sun et al., "Threshold Proxy Signatures," IEE Proceedings Computers and Digital Technique, 146(5): Sep. 22, 1999, pp. 259-263.
UK Commercial Search Report dated May 11, 2018, Patent Application No. GB1800706.2, 7 pages.
UK IPO Search Report dated Jul. 5, 2018, Patent Application No. GB1800706.2, 9 pages.
Wu et al. "Secure Joint Bitcoin Trading with Partially Blind Threshold Signatures," retrieved from https://link.springer.com/article/10.1007%2Fs00500-015-1997-6, Jun. 2017, 15 pages.

* cited by examiner

COMPUTER IMPLEMENTED METHOD AND SYSTEM FOR OBTAINING DIGITALLY SIGNED DATA

This invention relates generally to the security of data and computer-based resources. More particularly, it relates to cryptocurrencies and cryptography, and also to Elliptic Curve Cryptography, Elliptic Curve Digital Signature Algorithm (ECDSA), and Threshold Cryptography. It can be used to advantage in relation to blockchain-implemented cryptocurrencies such as (for example) Bitcoin but is not limited in this regard, and can have wider applicability. The invention may, in one embodiment, be described as providing a distribution protocol for blind dealerless thresholds.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

The concept of decentralisation is fundamental to the Bitcoin methodology. Decentralised systems provide the advantage that, unlike distributed or centralised systems, there is no single point of failure. Therefore, they offer an enhanced level of security and resilience. This security is further enhanced by the use of known cryptographic techniques such as Elliptic Curve Cryptography and ECDSA.

However, while the Bitcoin protocol itself has proved resilient to any significant attack at the time of filing the present application, there have been attacks on exchanges and wallets which supplement or build upon the Bitcoin network. As the value of Bitcoin increases, more incidents such as those involving Mt Gox and Bitlinex are likely to occur in standard centralised systems.

Thus, there is a need for a solution which further enhances the security of such systems. The invention provides such an advantage, amongst others.

The present invention provides method(s) and system(s) as defined in the appended claims.

In accordance with the invention there may be provided a method of obtaining digitally signed data, the method comprising:

sending first data from at least one of a plurality of first participants to at least one second participant, wherein said first data is based on second data accessible to at least one said first participant, and wherein said second data is inaccessible to the or each said second participant;

receiving, from at least one said second participant, a digital signature of said first data; and processing said digital signature of said first data, by a plurality of said first participants, to provide shares of a digital signature of said second data, wherein said digital signature of said second data is accessible by means of a threshold number of said shares and is inaccessible to less than said threshold number of shares.

By processing the digital signature of the first data, by a plurality of first participants, to provide shares of a digital signature of the second data, wherein the digital signature of the second data is accessible by means of a threshold number of shares and is inaccessible to less than the threshold number of shares, this provides the advantage of improved security since the second participant does not have access to the second data, but signs the first data and enables a digital signature of the second data to be provided, while further improving security by means of a threshold arrangement. This provides the advantage that a first participant can appoint a second participant as a custodian of private keys for signing messages, such as blockchain transactions, while preventing the second participant from being able to make unauthorised use of the keys because the second data is inaccessible to the second participant.

Each said share of said digital signature of said second data may include shares of a plurality of first secret values shared among a plurality of said first participants by means of joint random secret sharing (JRSS).

This provides the advantage of improving security by providing a dealerless secret value sharing scheme in which the first secret values are selected jointly by the first participants, thereby avoiding a point of weakness of the system in the form of a single dealer.

Each said share of said digital signature of said second data may include at least one first masking share, shared among said plurality of first participants by means of joint zero secret sharing (JZSS).

Said first data may be generated by means of shares of said first data such that said first data is accessible by means of a threshold number of said shares and is inaccessible to less than said threshold number of shares.

Each said share of said first data may include shares of a plurality of said first secret values shared among said plurality of said first participants by means of joint random secret sharing (JRSS).

Each said share of said first data may include at least one second masking share, shared among said plurality of first participants by means of joint zero secret sharing (JZSS).

The method may further comprise receiving, from at least one said second participant, third data based on said second secret values.

This provides the advantage of assisting generation of the digital signature of the second data from the digital signature of the first data.

The digital signature of the first data may be generated by means of shares of said digital signature of said first data, shared among a plurality of said second participants, wherein said digital signature of said first data is accessible by means of a threshold number of said shares and is inaccessible to less than said threshold number of said shares.

Each said share of said digital signature of said first data may include shares of a plurality of second secret values, shared among a plurality of said second participants by means of joint random secret sharing (JRSS).

Each said share of said digital signature of said first data may include at least one third masking share, shared among said plurality of said second participants by means of joint zero secret sharing (JZSS).

The second data may be a message.

The second data may be a hash value of a message.

The first data may be a blockchain transaction.

At least one said digital signature may be based on a cryptography system having a homomorphic property.

At least one said digital signature may be based on an elliptic curve cryptography system.

The invention also provides a system, comprising:
a processor; and
memory including executable instructions that, as a result of execution by the processor, causes the system to perform any embodiment of the computer-implemented method described herein.

The invention also provides a non-transitory computer-readable storage medium having stored thereon executable instructions that, as a result of being executed by a processor of a computer system, cause the computer system to at least perform an embodiment of the computer-implemented method described herein.

Figure 2:
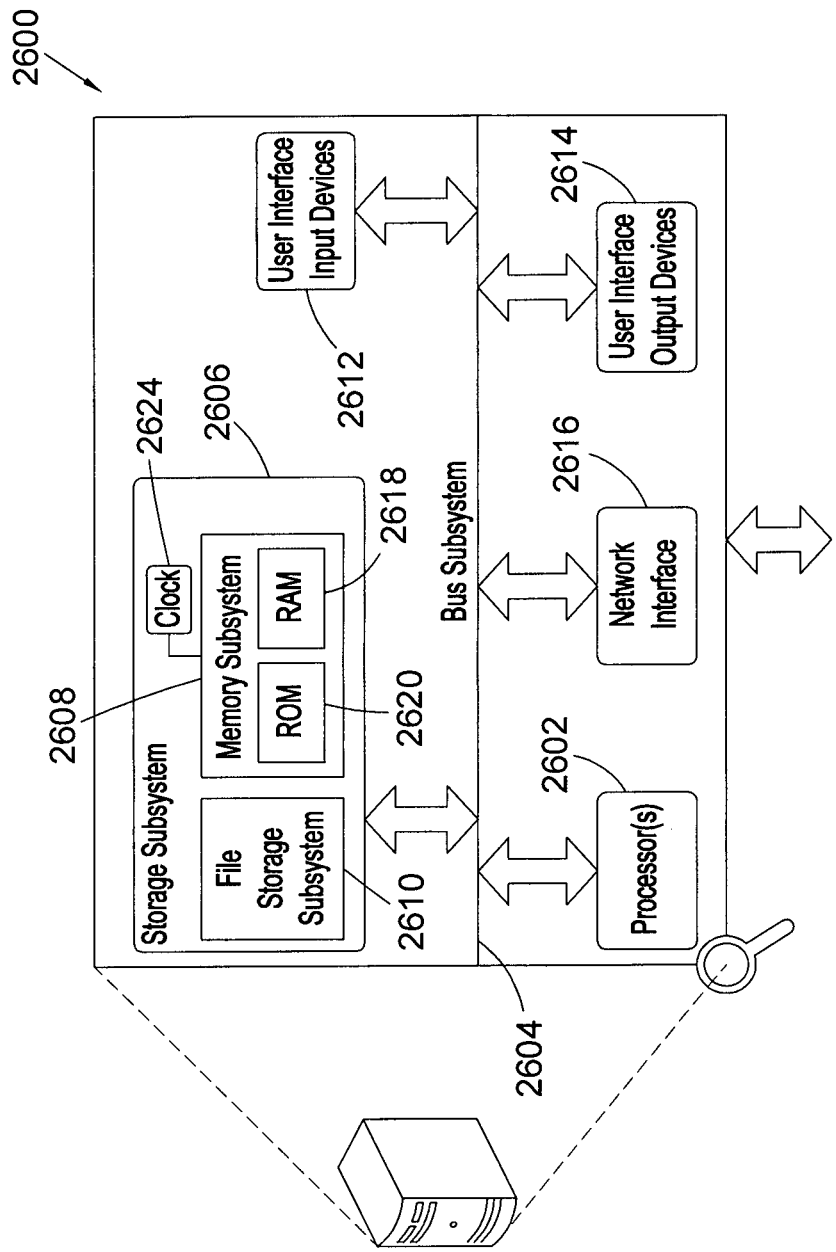

These and other aspects of the present invention will be apparent from and elucidated with reference to, the embodiment described herein. An embodiment of the present invention will now be described, by way of example only, and with reference to the accompany drawings, in which:

FIG. 1 is a schematic representation of a blind signature distribution system embodying the present invention; and FIG. 2 is a schematic diagram illustrates a computing environment in which various embodiments can be implemented.

OVERVIEW

In this application, a threshold based dealerless blind signature distribution system is described that is fully compatible with bitcoin. The system builds on a group signature scheme that departs from the traditional individual signing systems deployed within bitcoin wallets and adds a new system designed to allow for the distributed threshold blinded signing of messages. As deployed, the system is both extensible and robust tolerating errors and malicious adversaries. The system is supportive of both dealer and dealerless systems and deployment in an infinitely flexible combination of distributions.

A blind signature scheme allows for the signing of a message without knowledge of the content of the message. In bitcoin, this includes the ability to act as a trustee for a bitcoin private key without knowing which addresses or keys they are entrusted with.

Coupled with a threshold signature scheme, in which a document can be validly digitally signed by a threshold number of participants, but not by less than the threshold number of participants, this allows the holders of a bitcoin private key to create a system of trust where a message can be signed by the party managing the address without knowledge of the amounts being maintained. Thus a second participant, Alice, the owner of an amount of bitcoin, can use a first participant, Bob, to store her key in a manner that does not allow Bob to know how many bitcoin Alice controls. Alice can send more (or receive from other parties) to the blinded address without Bob being able to discover how many bitcoin (or for that matter the address of the bitcoin) that Alice holds and controls.

When combined with a thresholding system, Alice can have several parties act in concert without:
1) Knowing the identity of the other blinding parties
2) Secure her bitcoin over several systems in a way that allows her to access her funds even if a party was to no longer be available.

As the threshold blinded key leads to a signed message that involves using a blinded signature, the parties cannot collude to access Alice's funds, even where they too, gain access to the identity of the other parties and obtain a sufficient number of threshold shares to be able to blind sign a message, as this message is only valid when un-blinded into a standard ECDSA bitcoin signed transaction.

The threshold blinding technique also adds to the security of the base system with addresses having added randomness able to be injected helping to defend from a faulty RNG (Random Number Generator). The blind signing party can act as a key custodian or escrow. This can be as a backup to the primary keys in case of loss or to add a second layer of authorisation and control. The use of several systems or operators allows for a RAID-like key management system with added redundancy as well as added security when several independent parties are used as trust protectors.

In the existing implementations of Bitcoin, payer wallets can be lost, damaged or stolen. The funds will then be lost or unrecoverable. Hardware cryptocurrency wallets can be compromised or lost. In the system described in the present application, a hardware system can be divided into multiple parts and the hardware device can be moved or recreated securely. In the present application, the following symbols are used:

| ECDSA Elliptic Curve Digital Signature Algorithm | |
| --- | --- |
| n | Order of the elliptic curve |
| G | Generator point on the curve |
| $d_A$ | Private key (as an integer in the interval $[1, (n-1)]$ |
| $D_A$ | An ECDSA public key for $d_A$ |

-continued

| ECDSA Elliptic Curve Digital Signature Algorithm | |
|---|---|
| e | The cryptographic hash of the message (m), e = Hash(m) |
| k | The random value (ephemeral key) in range [1, (n − 1)] |
| (r, s) | The ECDSA signature where $r_x$ = k · G is the x coordinate of the point on the curve modulo (n) and s = $k^{-1}$(e + $d_A$ · r) mod n. |

Note:
$k^{-1}$ is inverse of k modulo (n) so that ($k^{-1}$ · k) = 1modn

The standard ECDSA values apply:

$$w = s^{-1} \bmod n$$

$$u_1 = e \cdot w \bmod n$$

$$u_2 = r \cdot w \bmod n$$

$$x = u_1 G + u_2 D_A$$

All the standard ECDSA rules apply. It is possible to construct a linear transformation such that:

$$s = x \cdot e + b$$

This relation is used in blinding the message to be signed. The second participant (Alice) can now sign a blinded message in place of the message to be used maintaining the message and just sending the blinded message hash.
1) Alice sends the blinded hash of a message to Bob, the first participant.
2) Bob signs the 'blinded hash' returning the signed value to Alice
3) Alice 'un-blinds' Bob's value to obtain the signature. This can be used to reconstruct a valid bitcoin transaction The threshold blinding can be completed extensibly with:
1) Alice's keys being split
2) Bob's values being split
3) Both Bob and Alice's keys split
4) Alice and Bob's keys whole but the values for blinding divided Let Alice select a value α in the range [1, (n−1)]. Next, calculate:

$$\beta = hash(\alpha+1)$$

$$\gamma = hash(\alpha+\beta)$$

$$\delta = hash(\alpha+\gamma)$$

If β is a threshold, Alice can be considered as a group of $T_u$ parties where $A_1$ to $A_{Tv}$ are the slices or threshold versions of Alice with a particular instance being denoted as $A_i$. Here α is selected using algorithm #1, which is described in more detail below.

Prior Work

Shamir Secret Sharing Scheme (SSSS)

Shamir (1979) first introduced a dealer based secret sharing scheme that allowed for a distributed management of keys. The problems associated with this scheme come from the necessity of trusting a dealer who cannot be verified. This form of the scheme is fully compatible with the system disclosed in the present application and can be used for group distribution of individual key slices that are created through the process noted herein.

Joint Random Secret Sharing (JRSS) (Pedersen, 1992)

The stated aim of this procedure is to create a method where a group of participants may collectively share a secret without any participant having knowledge of the secret. Each participant selects a random value as their local secret and distributes a value derived from this using SSSS with the group. Each participant then adds all the shares received from the participants, including its own. This sum is the joint random secret share. The randomness offered by a single honest participant is sufficient to maintain the confidentiality of the combined secret value. This state remains true even if all (n−1) other participants intentionally select non-random secret values).

Joint Zero Secret Sharing (JZSS) (Ben-Or, 1988)

JZSS is like JRSS, with the difference that each participant shares 0 as an alternative to the random value. The shares produced using this technique aid in removing any potential weak points in the JRSS algorithm.

Desmedt [1987] introduced the concept of group orientated cryptography. This process allowed a participant to send a message to a group of people in a manner that only allowed a selected subset of the participants to decrypt the message. In the system, the members were said to be known if the sender must know them using a public key and the group is anonymous if there is a single public key for the group that is held independently of the members. The system disclosed in the present application integrates both methodologies and allows for known and anonymous senders and signers to exist within a group simultaneously.

Blind Signatures (Chaum, 1982)

Blind signatures allow for a party to create a valid signature for another party in a secure manner without the message ever being viewed by the signer. In the system, only the signer is able to generate a valid signature whereas the owner of the message to be signed can be assured that their message has not been altered and is distributed correctly allowing them to redeem their funds in a system such as used within bitcoin. Furthermore, the system is unthinkable in that no party can derive a relationship between the blinded and unblinded values and signature pairs other than the parties requesting that the signature be applied.

The inclusion of blind signatures into a threshold system allows for the signing of a message in the bitcoin protocol where the signer cannot link ownership to a bitcoin address. In this manner, the signer cannot determine the amount of funds held by the party that they are protecting nor the amount being transferred. This additional level of privacy adds additional security as it is no longer possible to conspire within the threshold group protecting the keys to steal funds. This becomes infeasible due to the requirement to know which blinded keys would be associated with which deposits. In a peer-group, such a system could be constructed where a threshold group of members act to protect the keys of the other members. In this scenario, a group of depositors would each split the signing function between the other members such that no member knows the holdings of the others in the group.

This scenario could also be used on other forms of message exchange allowing a distributed peer-group to maintain the privacy of all members whilst not being able to reveal sensitive information related to members of the group.

Method and Implementation

The protocol of the present embodiment can encrypt the secret information required to be sent between participants using elliptic curve cryptography (ECC) based on a hierarchical derivation of private keys, in which case it is both possible and advisable to collate all messages into a single packet sent to all users such that validation can be done against potentially compromised or hostile participants when necessary.

Signature generation is proposed by a coordinating participant $p_{(c)}$. By default, any key slice can act as the coordinating participant and the requirements depend upon the individual implementation of the protocol. The algorithms used are documented below, and a later section provides detail as to their deployment.

Creating a Dealerless Blinded ECDSA Threshold Key

In the system of the present embodiment, an ownership group of first participants, Alice$_{(i)}$ is defined. This group is the beneficial controller of the private keys that are to be blind signed using the capacity of a group of second participants, the Bob$_{(i)}$ group or system.

Alice Group

To begin, the un-blinded threshold group Alice$_{(i)}$ selects a set of first secret values in the firm of random numbers.

$$\left.\begin{array}{l} A_{ai} \\ A_{bi} \\ A_{ci} \\ A_{di} \end{array}\right] \text{within } [1, (n-1)]$$

The group has $T_v$ members in a $T_u$ threshold such that $A_{ai}$ is the $i^{th}$ member's slice of secret $A_a$.

Algorithm 1-Key Generation—for a More Detailed Version of Algorithm 1, See Appendix Below Domain Parameters (CURVE, Cardinality n, Generator G)

Input: N/A
Output: Blinding Key Shares $A_{a1}, \ldots, A_{ai}, A_{b1}, \ldots A_{bi}, A_{c1}, \ldots A_{ci}, A_{d1}, \ldots A_{di}$.

Using algorithm 1, the members of Alice's group can engage in a JRSS $T_u$ of $T_v$ threshold exchange. Here, a threshold number $T_u$ of $T_v$ members of Alice are required to create or use the second secret value $A_a$.

Similarly, a JRSS process is used with algorithm 1 to create the further second secret values $A_b$ with $A_{bi}$, $A_c$ with $A_{ci}$ and $A_d$ with $A_{di}$.

Each of the values can be used and created using the same threshold group (u, v) or each value can be divided and created using separate threshold values and members.

In this system, the various secrets, $A_{ai}, A_{bi}, A_{ci}$ and $A_{di}$ are only used once. If these values need to be used again, algorithm 2, described in greater detail below, is used to re-share the secret using a JZSS variant.

Algorithm 2 Updating the Private Key—for a More Detailed Version of Algorithm 2, See Appendix Below Input: Participant $P_i$'s share of private key $A_a, A_b, A_c, A_d$ denoted as $A'_{ai}, A'_{bi}, A'_{ci}, A_{di}$ respectively.
Output: Participant $P_i$'s new private key share
$A'_{ai}, A'_{bi}, A'_{ci}, A'_{di}$ In the ideal case (only one set of shares ($T_u$, $T_v$)) where only a single Alice group exists, the process requires $T_v$ broadcasts as values.

$A_{ai}, A_{bi}, A_{ci}, A_{di}$ can each be sent in a single broadcast message.

Bob Group

The Bob Group Bob$_{(i)}$ of first participants is defined to be the signing group. This group has ($T_u'$, $T_v'$) or $T_u'$ members of $T_v'$ total members required in order to share and use the first secret values (Bp,Bq) where Bp and Bq are the recreated blinding values used by the Bob group to sign a blinded message for the Alice group.

Algorithm 4 Bob Group's Blinding Key

1) Members of Bob group, Bob$_{(i)}$, select a set of second secret values in the form of random numbers:

$$\left.\begin{array}{l} Bp_i \\ Bq_i \end{array}\right] \begin{array}{l} \text{within } [i, (n-1)] \\ \forall i \in (1, T_v) \end{array}$$

2) The Bob group computes the following values:
  a) $BP = (Bp^{-1} \cdot G)$
  b) $BQ = (Bq \cdot Bp^{-1} \cdot G)$ Here, BP is computed using a variant of algorithm 3, described in greater detail in the appendix to the present application.

3) Generate mask shares—
$b_{ai} \leftarrow Z_q$ using JRSS
$b_{bi}, b_{ci} \leftarrow Z_q^2$ with JZSS 4) Broadcast—
$a_i = Bp_i \cdot b_{ai} + b_{bi} \mod q$ $\beta_i = G \times b_{ai}$ 5) $\chi = \text{Interpolate}(\alpha_i, \ldots, \alpha_{Tv})$ $[=Bp \cdot b_a \mod q]$ Where the operation Interpolate ($\alpha_i, \ldots \alpha_{Tv}$) represents recovery of the secret value shared among the participants by the shares $\alpha_i$.

6) $\delta) = \text{Exp Interpolate}(\beta_i, \ldots, \beta_{Tv})$ $= G \times b_a$ Where the operation Exp—Interpolate ($\beta_i, \ldots, \beta_{Tv}$ represents recovery of the elliptic curve point secret value shared among the participants by the shares $\beta_i$.

7) $((Bp^{-1} \cdot b_a^{-1}) \times b_a \times G) = \delta \times \chi^{-1}$

▷ $[=G \times Bp^{-1}]$

This is a point function and we can use $(Bp^{-1} \times G)$ as input into a modified algorithm 1.

8) Using $Bq_i$, i.e. shares of $B_q$, and $(Bp^{-1}G)$ from Step (7), each member of Bob (i) will broadcast:

$f_i \times (Bp^{-1} \cdot G)$

9) $BQ = \text{Exp—Interpolate}(f_1, \ldots, f_{Tv})$

▷ $[Bq \cdot Bp^{-1} \cdot G]$

10) The two EC points BP and BQ are sent to the Alice group in the form of third data. A secret exchange can be used to maintain confidentiality, implemented for example as disclosed in International patent application WO2017/145016.

Threshold Message to be Blinded

Next, Alice(i) group uses the values from the Bob(i) group to compute a value that can be safely published as it has been blinded using (5).

Algorithm 5 Alice (Single Group)

Alice knows BP and BQ from a prior broadcast of the Bob(i) group.

Alice starts by computing the secret value:

$A_K = (A_c \cdot A_a)^{-1} BP$

This is done as follows:
1) Create mask shares:
$M_{ai}$ using JZSS, so $M_{ai} \leftarrow Z_q^2$ with JZSS.
2) Alice(i) broadcasts the value:

$A\mu_i = (A_{ci} \cdot A_{ai}) + M_{ai} \mod q$ $[\triangleright = A_c \cdot A_{ai} \mod q]$ 3) Alice(i) group now computes $A\mu$ where:

$A_\mu = \text{Interpolate } (A_{\mu 1}, \ldots, A_{\mu Tv}) \mod q$ $= A_c \cdot A_a \mod q$ Hence $A_{-1} = (A_c \cdot A_a)^{-1}$ 4) $A_k = A_\mu^{-1} BP$ ▷ $[=(A_c \cdot A_a)^{-1} \times BP]$ Next Alice(i) group calculates the blinded B public key.

$A_T = (A_a \cdot A_{K(x)})^{-1}(A_b G + BQ + A_d \cdot A_c^{-1} \times BP]$

Where $A_{K(x)}$ represents the x-coordinate of the elliptic curve point $A_K$.

Bob group does not know $A_T$ or $A_K$ and cannot determine if any of his values or efforts are involved in any movement of funds to and from $A_T$ and the related bitcoin address without discovering $A_a$, $A_b$, $A_c$, and $A_d$. If the Alice group maintains these as a secure threshold, Bob or any other party can never know Alice's details.

Alice may now use the public key, $A_T$ in the standard creation of a bitcoin address and will further obscure any ability to have Bob(i) determine her address even though Bob was instrumental in helping sign a transaction.

Algorithm 6—Alice Calculates a Public Key
1) Generate mask shares:
   $M_{ai} Z \leftarrow Z_q^2$ using JRSS
2) Generate mask shares:
   $M_{bi} M_{ci} \leftarrow Z_q^2$ using JZSS
3) Calculate:

$A\mu_i = (A_{ai} \cdot A_{K(x)})$

▷ $[=A_a \cdot A_{K(x)} \mod q]$

Broadcast $A\mu_i$ to all Alice(i) members.
(where $A_{K(x)}$ is the x coordinate of the point $A_K$)
4) Calculate $(A_b \cdot G)$ using algorithm 1.
   Here, $A\mathfrak{f}_i = G \times A_{bi}$
   Broadcast $A\mathfrak{f}_i$ to all Alice(i) members.

$(A_b \cdot G)$ = Exp—Interpolate$(A\mathfrak{f}_i, \ldots A\mathfrak{f}_{Tv})$

▷ $[=A_b \times G]$

5) Calculate $[A_a \cdot A_{K(x)}]^{-1}$
   First take $A_\mu$
   Now $A_\mu$ = Interpolate $(A_{\mu i}, \ldots, A_{\mu Tv}) \mod q$ ▷ $[=A_a \cdot A_{K(x)}]$ Thus, this can be used to calculate for $[A_a A_{K(x)}]^{-1}$ later.
6) The value $(A_c^{-1} \cdot BP)$ is first calculated using the same method as was used in algorithm 4.
7) This is used to calculate the value $(A_d \cdot A_c^{-1} \cdot BP)$
8) Generate mask shares:
   $M_{di} \leftarrow Z_q$ using JRSS
   $M_{ei}, M_{fi} \leftarrow Z_q^2$ using JZSS
9) Broadcast the values to the Alice(i) group:

$\alpha_i = A_{ci} M_{di} + M_{ei} \mod q$ $\beta_i = BP \times M_{di}$

10) $\chi$ = Interpolate $(\alpha, \ldots, \alpha_{Tv})$

▷ $[=(A_c M_d) \mod q]$

11) $\delta$ = Exp-Interpolate $(\beta_1, \ldots \beta_{Tv})$

▷ $[=BP \times M_d]$

12) $(A_c^{-1} \cdot BP) = \chi^{-1} \times \delta$

▷ $[=(BP \times A_c^{-1})]$

Return $A_c^{-1} \cdot BP$ as a point on the curve BP. This is used as input into algorithm 1.

13) Using $A_{di}$ and the EC point $(A_c^{-1} \cdot BP)$, each member of Alice(i) broadcasts:

$\mathfrak{f}_i = A_{di} \times (A_c^{-1} BP)$

14) $A_d \cdot A_c^{-1} \cdot BP$ = Exp—Interpolate$(\mathfrak{f}_1, \ldots, \mathfrak{f}_{Tv})$ ▷ $[=(A_d \cdot A_c^{-1} \cdot BP)]$ 15) Now all of the parts are present for calculating the public key $A_T$. This is calculated using the formula:

$$A_T = (A_a \cdot A_{K(x)})^{-1} \cdot (A_b \cdot G + BQ + A_d \cdot A_c^{-1} BP) = \qquad (1)$$
$$A_a^{-1} A_{K(x)}^{-1} (A_b + BqBp^{-1} + A_d A_{c-1} Bp^{-1}) G$$

That is:
Algorithm $(5.4) \times [(6.4) + BQ + (6.14)]$ which returns the EC point $A_T$ which functions as the blinded public key.

Creating the Bitcoin Address
This public key is transformed in the standard manner to create a bitcoin address:

$A_T = A_T(x, y)$

1) Use the parity of $A_T(y)$ and the full $A_T(x)$ co-ordinate to represent the public key.
2) Hash the public key two times
   a) Using SHA256
   b) Using RIPEMD160
3) Prepend the version (this is the bitcoin address version No.) number. If the protocol is standard, version 01 is used. It is also possible to make this a version 03 if P2SH is to be used.
4) Append the checksum to the end of the versioned public key hash from (3). The checksum is the first 4 bytes of a double SHA256 hash of the value returned from (3).
5) BASE58 encode the value created in (4). This is a standard format bitcoin address and the Alice (i) group may receive payments to this address and this address will display as per any normal bitcoin address at this point.

No party, including Bob, is able to see who owns the address for $A_T$ unless Alice leaks the values $A_a$, $A_b$, $A_c$ & $A_d$.

Even if these are leaked, Alice(i) does not need to let others know that these values are related to the Bob(i) signing group. If Alice has a poor RNG, she is still safe as Bob(i) can inject randomness into the procedure.

Blinded Signing in Threshold groups.
To sign a message, a requirement of spending a Bitcoin, or to sign any other message (such as for an email message on an anonymous host), the Alice(i) group needs to have the hash $e = h(m)$ of the message or transaction. With the message (or transaction) and a signed hash, Alice(i) is able to reconstruct the message (transaction) and redeem funds from the Bitcoin public key $A_T$ and associated Bitcoin base 58 address.

Algorithm 3 Signature Generation—for a More Detailed Version of Algorithm 3, See Appendix Below
Domain Parameters: CURVE, Cardinality n, Generator G
Input: Message to be signed $e = H(m)$
Private Key Share $d_{A(i)} \in Z_n^*$
Output: Signature $(r, s) \in Z_n^*$ for $e = H(m)$ Alice maintains privacy by not letting Bob(i) know the content of the message (transaction). So Bob(i) does not discover that he is signing a message related to $A_T$, Alice(i) blinds the hash value.

Algorithm 7—Blinding the Hash
Alice creates first data in the form of a blinded version of the second data, the hashed message (transaction) e.

Here $e_2=A_a \cdot e+A_b \pmod q$. This is created as follows:
1) Alice(i) starts by generating mask shares $Mai \leftarrow Zq$ using JZSS
2) Alice(i) will send the values $Av(i)=Aa(i)e+Ab(i)+Ma(i) \bmod q$ Alice(i) sends the value Av(i) to the other Alice members who can interpolate this value set 3) $e_2=\text{Interpolate}(Av_1, \ldots, Av_v)$ $$=A_a \cdot e+A_b \bmod q$$

4) $e_2$ is broadcast to the Bob(i) group. This would be done using an encrypted channel where Bob verifies Alice's identity. This can be achieved, for example, by means of an arrangement as disclosed in International patent application WO2017/145016. Here Alice pays Bob for the signing and exchanges over a closed encrypted session channel.

If Bob receives a message from a non-Alice party and signs this, the value cannot be un-blinded so it remains safe. Even though Bob has a payment and a record, he has no information concerning the signed Alice transaction, as the value $e_2$ is blinded and Alice did not send Bob the message but only the blinded hash.

The Bob group now signs the blinded hash and returns this, i.e. a digital signature of the first data, to Alice.

Bob (i) is creating a message $s_1=Bp \cdot e_2+Bq \bmod q$ $s_1$ will be returned to Alice and is a blinded version of the signature.

To do this, Bob(i) uses Algorithm 8 to sign from his threshold group and return $s_1$ to Alice(i)

Algorithm 8

$$s_1=Bp \cdot e_2+Bq \bmod q$$

1) Bob(i) creates a mask share using JZSS.

$$M_{b(i)} \leftarrow Z_q^2 \text{ with JZSS}$$

2) Bob(i) broadcasts $$Bs_i=Bp_{(i)} \cdot e_2+Bq_{(i)}+M_{b(i)} \bmod q$$

3) $s_1=\text{Interpolate}(Bs_1, \ldots, Bs_{Tv})$

▷ $[=Bp \cdot e_2+Bq \bmod q]$

4) Bob(i) sends $s_1$, the blinded $s_1$ signature value to Alice(i)

Alice now has the blinded $s_1$ part of the signature as well as the r part which is $(A_{K(x)})$.

Alice(i) can use a threshold un-blinding method to recover the s signature value, i.e. the digital signature of the second data, from the blinded $s_1$ value using algorithm 9.

Algorithm 9

Alice(i) wants to obtain the un-blinded s signature component from the $s_1$ blinded part. She does this by calculating $s=A_c \cdot s_1+A_d \pmod q$.

To do this she:
1) Creates a hash share using JZSS
$M_{a(i)} \leftarrow Z_q^2$ with JZSS
2) Alice(i) broadcasts $$s_i=A_{c(i)}s_1+A_{d(i)}+M_{a(i)}$$

To all other Alice members.
3) $s=\text{Interpolate}(s_1, \ldots s_{Tv})$

▷ $[=A_c \cdot s_1+A_d \pmod q)]$

Each party in the Alice(i) group now has $(A_{K(x)}, s)$ which is a valid ECDSA signature and can be verified as usual in the Bitcoin protocol using the public key $A_T$ or the related Bitcoin address.

S can be shown to be a valid ECDSA signature of e as follows.

Expanding s $$s = A_c s_1 + A_d = A_c(Bpe_2 + Bq) + A_d =$$
$$A_c Bp(A_a e + A_b) + A_c Bq + A_d = A_c BpA_a e + A_c BpA_b + A_c Bq + A_d =$$
$$(A_c BpA_a)(e + A_a^{-1}[A_b + BpBq^{-1} + A_d A_c^{-1}Bp^{-1}])$$

But from equation 1 above, the private key $d_A$ corresponding to public key $A_T$ is $$A_a^{-1}A_{K(x)}^{-1}(A_b+Bq \; Bp^{-1}+A_d A_c^{-1}Bp^{-1})$$

From this, it follows that
$s=(A_c Bp \;\; A_a) \;\; [e+A_{K(x)}d_A]=k^{-1}[e+A_{K(x)}d_A]$, where $k=(A_c Bp \; A_a)^{-1}$, from which is can be seen that s is a valid ECDSA signature of e and is verifiable by public key $A_T$.

This signature with the message will be able to form a standard bitcoin transaction where Alice(i) can redeem funds if it is broadcast to the Bitcoin network.

Bob(i) will not have any information as to which address Alice has used.

He will not know either the Bitcoin address, nor the amount of the transaction, nor where it is being sent to.

Even though Bob(i) holds and protects the keys, he has no knowledge of the transaction.

Security Considerations

Benger et. al. (2014) offered one example of ECDSA private key recovery using a Flash and reload methodology. This occurrence is but one example of attacks against system RAM and Cache. These methods leave the use of procedures such as that of Shamir's SSS [1979] wanting as they reconstruct the private key. Moreover, in any scenario in which a private key is reconstructed a requirement for trust is introduced. It is necessary in this scenario to rely on the systems and processes of the entity holding the private key. Even if the trusted party is not malicious, there is a necessity to rely on their processes. As has been seen from many recent compromises, this reliance on reconstructing the private key leaves avenues of attack.

As both a drop-in replacement for the existing ECDSA implementations as well as being completely transparent and compatible with the current bitcoin protocol, no hard fork or soft fork is required for its implementation, and the implementation is indistinguishable from any current transaction. The present invention can treat individuals as separate participants allowing for the group signing of keys with a recovery function. As an example, a two of two scheme can be implemented using four key slices where the online wallet provider or exchange maintains two key slices and the end user maintains two slices. The exchange and the user would each have a two of two process over their key slices which would then be used in conjunction with each other for the secure signing of a message when required.

In the scheme, the group Bob(i) can view at least the hash of the message supplied from Alice(i).

1. As no member of Bob(i) either collectively or independently knows the values $A_a$ or $A_b$ it is not possible for any member of this group to determine whether $e_2$ as a blinded version of the message hash, e.
2. Likewise, Bob(i) has no knowledge of the values $A_c$ or $A_d$ and hence is unable to determine the relationship between the signature values s and $s_1$.
3. In a similar manner used in the calculation of Rabin ( ) signatures, Bob(i) cannot readily determine the value $A_aA_c$. Under the assumptions of the elliptic curve discrete logarithm problem, Bob(i) is unable to determine the relationship between $A_T(x)$ and the elliptic curve point BP.

4. In a similar manner, Bob(i) gains no knowledge on whether the values BP or BQ have been used in constructing Alice(i) groups public key $A_T(x, y)$.
5. Here, once the unblinded message has been broadcast by Alice(i), the values of the public key associated with the transaction remain obscured. If Alice(i) delays broadcasting the blind message signature received from Bob(i), the inclusion of many other transactions within a bitcoin block means that Bob(i) cannot determine anything more than that Alice(i) had a message signed and could have possibly transacted it after it was received.
6. No external party need have any information concerning the transaction between Alice(i) and Bob(i) and hence the level of privacy between these parties is enhanced.

The effective outcome of this process is that threshold group of Alice(i) members who may or may not represent the entirety of the group are able to send to a Guardian group Bob(i) who can aid in the signing of a transaction or other message whilst the contents of the message supplied by Alice(i) remain hidden.

As long as Alice(i) remains in a position where she has some plausible deniability to the sending of a message and the volume of messages within the system (such as bitcoin) remains significantly above zero, Bob(i) is unable to determine messages that may have come from Alice(i).

It is important in the scheme that Alice(i) does not reuse parameters $A_a$ & $A_b$ when signing different hash values. If these values are reused with a different value e, this would enable the calculation of information leading to Bob(i) being able to link the obscured hash $e_2$ with the original hash value for the broadcast message e. This results as the additions of further linear equations lead to a scenario where Bob(i) can interpolate the relationship between $A_a$ & $A_b$ and hence message e. The result is, Bob(i) will be able to search on the Blockchain for that value e and link to the corresponding Alice(i) groups public key $A_T(x,y)$ and possibly other derived public keys associated with this group.

In a similar manner, it is important that Alice(i) does not reuse parameters $A_c$ & $A_d$ as this would lead to Bob(i) being able to calculate the relationship between the blinded and published signatures used by Alice(i) and hence, search the Blockchain in a similar manner to a reuse of parameters $A_a$ & $A_b$ allowing him to determine the Alice(i) groups public key $A_T(x, y)$.

Likewise, the parameters $B_p$ & $B_q$ and BP & BQ generated by Bob(i) should not be reused and without these, Alice(i) cannot create a forgery of a blinded signature created by Bob(i) and hence cannot unblind such a signature that would appear to be generated by public key $A_T(x,y)$. As the values $B_p$ & $B_q$ are calculated by Bob(i) using a derived key scheme, for example, by means of an arrangement as disclosed in International patent application WO2017/145016, each value of $B_p$ & $B_q$ is unique to each message generated by Alice(i) and in the assumption of a collision free hash algorithm, any party using the service will have their own versions of $B_p$ & $B_q$ generated for each message that are never reused.

The present invention enhances what cryptocurrencies seek achieve with the introduction of a group signature process. The addition of a fault tolerable signing system with the coupling of a distributed key creation system removes all centralisation and trust requirements. Many systems will evolve with the need for trust. Moreover, the introduction of an implicitly decentralised system allows for the creation of more robust and resilient protocols. The compatibility between ECDSA [Johnson, 2001] and Shamir's SSS [Shamir, 1979] has allowed the introduction of a system that extends bitcoin with a new verifiable secret sharing scheme. This system is far more efficient than anything derived by Feldman [Feldman, 1987] or Pedersen [Pedersen, 1992] while losing nothing in security.

The introduction of threshold signature blinding extending the work of Chaum (1982) leads to a scenario where no trusted party needs to exist even within web-based exchanges. In this, true form of pseudonymous digital cash or asset transfer system can be maintained and even linked into a secure private voting system.

In the present application, a system is disclosed that extends the functionality of bitcoin without the requirement for a change in the base protocol. Using the system of the present invention;

1. a trusted third-party is no longer required for the selection or distribution of a key secret,
2. a distributed banking exchange system can be created that does not rely on third-party trust,
3. each member or group of members may independently verify that the share of the secret key that is held corresponds to the bitcoin address and public key advertised,
4. a protocol exists to refresh the private key slices to mitigate the effects of eavesdropping and related attacks, and
5. no trusted third-party is required for the group signing of transactions and messages.
6. A third party can maintain the integrity of the key in a threshold group. This group of signers will not know how many bitcoin or other assets are held under their protection. As this is a threshold system, if some members of the signing group are unavailable, it remains possible for other members to blindly sign the transaction allowing removal of funds being protected.

As the system of the present invention sensitive data from ever appearing in memory, it has solved many extant security risks. Further, it allows for the distribution of exchange based systems, web wallets and other forms of commerce. In this system, hierarchical threshold groups can interact with other hierarchical threshold groups to ensure the integrity of keys over time. In this scenario, solutions that allow for the transfer of funds on given events can be created. Such a scenario would include Wills and estate transfers that can be controlled and protected allowing for the recovery of keys in a variety of scenarios.

Turning now to FIG. 2, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 2, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor (s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended.

Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 2 is intended only as a specific example for purposes of illustrating the preferred embodiment of the device. Many other configurations having more or fewer components than the system depicted in FIG. 2 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

APPENDIX

Algorithm 1 Key Generation

Domain Parameters (CURVE, Cardinality n, Generator G)

Input: N/A

Output: Blinding Key Shares $\alpha_{A(1)}, \alpha_{A(2)}, \ldots, \alpha_{A(i)}, \ldots, \alpha_{A(m)}$ For a threshold of l slices from (m) participants, a blinding key segment $\alpha_{A(i)}$ is constructed which is associated with participant (i) and (m−1) participants nominated as participant(h) that are the other parties that participant (i) exchanges secrets with to sign a blinding key.

In the scheme, m is the total number of participants where
  l≤m and hence i=m−1

Hence, there is a (l+1,m)—threshold sharing scheme.

The method for algorithm 1 follows:

1) Each participant $p_{(i)}$ of (j) where $1 \leq i \leq j$ exchanges an ECC public key (or in this implementation, a Bitcoin address) with all other participants. This address is the Group identity address and does not need to be used for any other purpose.

It should be noted that this is a derived address, for example as disclosed in International patent application WO2017/145016, and key based on a shared value between each of the participants from the process disclosed therein.

2) Each participant $p_{(i)}$ selects a polynomial $f_i(x)$ of degree (k-1) with random coefficients in a manner that is secret from all other parties.

This function is subject to the participant's secret $a_0^{(i)}$ that is selected as the polynomial free term. This value is not shared. This value is calculated using a derived private key.

$f_i(h)$ is defined to be the result of the function, $f_x$) that was selected by participant $p_{(i)}$ for the value at point (x=h), and the base equation for participant $p_{(i)}$ is defined as the function: $f_{(x)} = \Sigma_{p=0}^{(k-1)} a_p x^p \mod n$ In this equation, $a_0$ is the secret for each participant $p_{(i)}$ and is not shared.

Hence, each participant $p_{(i)}$ has a secretly kept function $f_i(x)$ that is expressed as the degree (k-1) polynomial with a free term $a_0^{(i)}$ being defined as that participant's secret such that:

$f_{i(x)} = \Sigma_{\gamma=0}^{(k-1)} a_\gamma x^\gamma \mod n$

3) Each participant $p_{(i)}$ encrypts $f_i(h)$ to participant $P_{(h)}$ $\forall h = \{1, \ldots, (i-1), (i+1), \ldots, j\}$ using $P_{(h)}$'s public key as noted above and exchanges the value for $P_{(h)}$ to decrypt.

It should be noted that $n \times G = \emptyset$ for any basic point G.

As such for any set of integers B: $\{b_i \in Z_n\}$ that can be represented as $(b, b_1, b_2, \ldots)$, if $bG = [b_1 G + b_2 G + \ldots] \mod p$, then $b = [b_1 + b_2 + \ldots] \mod n$. Further, if $bG = [b_1 b_2 \ldots] \mod p$ then $b = [b_1 b_2 \ldots] \mod n$.

Given that $Z_n$ is a field and it is possible to validly do Lagrange interpolation modulo n over the values selected as ECC private keys, a condition exists which leads to the conclusion that Shamir's Secret Sharing Scheme SSSS [5] can be implemented over $Z_n$.

4) Each participant $P_{(i)}$ broadcasts the values below to all participants.

a) $a_\kappa^{(i)} G \forall \kappa = \{0, \ldots, (k-1)\}$
b) $f_i(h) G \forall h = \{1, \ldots, j\}$ The value associated with the variable h in the equation above can either be the position of the participant $P_{(h)}$ such that if participant $P_{(h)}$ represents the third participant in a scheme, then h=3 or equally may represent the value of the ECC public key used by the participant as an integer. Use cases and scenarios exist for either implementation. In the latter implementation, the value $h = \{1, \ldots, j\}$ would be replaced by an array of values mapped to the individual participant's utilised public key.

5) Each participant $P_{(h \neq i)}$ verifies the consistency of the received shares with those received from each other participant. That is:

$\Sigma_{\kappa=0}^{(k-1)} h^\kappa a_\kappa^{(i)} G = f_i(h) G$

And that $f_i(h) G$ is consistent with the participant's share.

6) Each participant $P_{(h \neq i)}$ validates that the share owned by that participant $(P_{(h \neq i)})$ and which was received is consistent with the other received shares:

$a_0^{(i)} G = \Sigma_{h \in B} \beta_j f_i(h) G \forall P_{(h \neq i)}$

If this is not consistent, the participant rejects the protocol and starts again.

7) Participant $p_{(i)}$ now either calculates their share $d_{A(i)}$ as:
SHARE$(p_{(i)}) = d_{A(i)} = \Sigma_{h=1}^{j} f_h(i) \mod n$
Where: SHARE$(p_{(i)}) \in Z_n$ and $d_{A(i)}$
and
Where: $Q_A = $Exp—Interpolate$(f_1, \ldots, f_j) \triangleright [=G \times d_A]$
Return $(d_{A(i)}, Q_A)$ Participant $p_{(i)}$ now uses the share in calculating signatures. This role can be conducted by any participant or by a party $p_{(c)}$ that acts as a coordinator in the process of collecting a signature. The participant $p_{(c)}$ can vary and does not need to be the same party on each attempt to collect enough shares to sign a transaction.

Hence private key shares $d_{A(i)} \leftarrow Z_n^*$ have been created without knowledge of the other participant's shares.

Algorithm 2 Updating the Private Key
Input: Participant $P_i$'s share of private key $d_A$ denoted as $d_{A(i)}$.
Output: Participant $P_i$'s new private key share $d_{A(i)}$'.

Algorithm 2 can be used to both update the private key as well as to add randomness into the protocol.

It is possible to perform recalculation of hierarchical sub-keys without the reconstruction or even calculated existence of the private keys. In this manner, it is possible to construct hierarchies of bitcoin addresses and private key slices that when correctly deployed will remove any large-scale fraud or database theft as has occurred in the past.

1) Each participant selects a random polynomial of degree (k-1) subject to zero as its free term. This is analogous to Algorithm 1 but that the participants must validate that the selected secret of all other participants is zero.

It should be noted that: $\emptyset G = nG = 0$ where 0 is a point at infinity on the elliptic curve.

Using this equality, all active participants validate the function:

$a_0^{(i)} G = \emptyset \forall i = \{1, \ldots j\}$

See Feldman (1987) for an analogy.
Generate the zero share: $z_i \leftarrow Z_n^*$
2) $d_{A(i)}' = d_{A(i)} + z_i$
3) Return: $d_{A(i)}'$ The result of this algorithm is a new key share that is associated with the original private key. A variation of this algorithm makes the ability to both increase the randomness of the first algorithm or to engage in a re-sharing exercise that results in new key slices without the need to change the bitcoin address possible. In this way, the protocol of the present invention allows a group to additively mask a private key share without altering the underlying private key. This process can be used to minimise any potential key leakage associated with the continued use and deployment of the individual key shares without changing the underlying bitcoin address and private key.

Algorithm 3 Signature Generation
Domain Parameters: CURVE, Cardinality n, Generator G
Input: Message to be signed e=H (m)
Private Key Share $d_{A(i)} \in Z_n^*$
Output: Signature $(r,s) \in Z_n^*$ for e=H(m)
A) Distributed Key Generation
1) Generate the ephemeral key shares using Algorithm 1:

$D_{k(i)} \leftarrow Z_n^*$

2) Generate Mask shares using Algorithm 1:

$a_i \leftarrow Z_n$

3) Generate Mask shares with Algorithm 2:

$\beta_i, c_i \leftarrow Z_n^2$

B) Signature Generation 4) e=H (m) Validate the hash of the message m

5) Broadcast $$\vartheta_i = D_{k(i)}\alpha_i + \beta_i \bmod n$$

And $$\omega_i = G \times \alpha_i$$

6) $\mu$=Interpolate ($\vartheta_i, \ldots, \vartheta_n$) mod n

▷ [$=D_k\alpha$ mod $n$]

7) $\theta$=Exp—Interpolate ($\omega_1, \ldots, \omega_n$)

▷ [$=G \times \alpha$]

8) Calculate ($R_x$, $R_y$) where $r_{x,y}=(R_x,R_y)=\theta \times \mu^{-1}$

▷ [$=G \times D_k^{-1}$]]

9) $r=r_x=R_x$ mod n
   If r=0, start again (i.e. from the initial distribution)
10) Broadcast $S_i=D_{k(i)}(e+D_{A(i)}r)+C_i$ mod n
11) S=Interpolate($s_i, \ldots, s_n$) mod n
    If s=0 redo Algorithm 3 from the start (A.1).
12) Return (r,s)
13) In Bitcoin, reconstruct the transaction with the (r, s) pair to form a standard transaction.

REFERENCES

1) Bar-Ilan, J. Beaver, "Non-Cryptographic Fault-Tolerant Computing in a Constant Number of Rounds", Proc. of 8th PODC, pp. 201-209, 1989.
2) Berlekamp, Elwyn R. (1968), Algebraic Coding Theory, McGraw-Hill, New York, NY
3) Benger, N., van de Pol, J., Smart, N. P., Yarom, Y.: "Ooh Aah . . . Just a Little Bit": A Small Amount of Side Channel Can Go a Long Way. In: Batina, L., Robshaw, M. (eds.) Cryptographic Hardware and Embedded Systems¦CHES 2014, LNCS, vol. 8731, pp. 75-92. Springer (2014)
4) Ben-Or, M., Goldwasser, S., Wigderson, A.: "Completeness theorems for noncryptographic fault-tolerant distributed computation". In: Proceedings of the Twentieth Annual ACM Symposium on Theory of Computing. pp. 1-10. STOC '88, ACM, New York, NY, USA (1988)
5) BIP 65 OP_CHECKLOCKTIMEVERIFY https://github.com/bitcoin/bips/blob/master/bip-0065.mediawiki
6) Chaum, David (1983). "*Blind signatures for untraceable payments*" (PDF). Advances in Cryptology Proceedings of Crypto. 82 (3): 199-203.
7) Chen T. S. Huang G. S. Liu T. P. and Chung Y. F. (2002), 'Digital Signature Scheme Resulted from Identification Protocol for Elliptic Curve Cryptosystem', Proceedings of IEEE TENCON'02. pp. 192-195
8) Chinnici M. (1995), 'CUDA Based Implementation of Parallelized Pollard's rho algorithm for Menezes A. and Vanstone S. Elliptic Curve Systems', Proposed IEEE P1363 Standard, pp. 142.
9) Chwei-Shyong Tsai, Min-Shiang Hwang, pei-ChenSung, "Blind Signature Scheme Based on Elliptic Curve Cryptography" (http://mshwang.ccs.asia.edu.tw/www/myjournal/P191.pdf.)
10) Dawson, E.; Donovan, D. (1994), *"The breadth of Shamir's secret-sharing scheme"*, Computers & Security, 13: Pp. 69-78
11) Desmedt. Yuo (1987). "Society and Group Oriented Cryptography: A New Concept". In A Conference on the Theory and Applications of Cryptographic Techniques on Advances in Cryptology (CRYPTO '87), Carl Pomerance (Ed.). Springer-Verlag, London, UK, UK, 120-127.
12) ElGamal T. (1985), 'A Public-Key Cryptosystem and a Signature Scheme Based on Discrete Logarithms', IEEE Transactions on Information Theory, Vol. 31, pp. 469-472.
13) Feldman. P. *"A practical scheme for non-interactive verifiable secret sharing"*. In Proceedings of the 28th IEEE Annual Symposium on Foundations of Computer Science, pages 427-437, 1987.
14) Gennaro, R., Jarecki, S., Krawczyk, H., Rabin, T.: "*Robust threshold DSS signatures*". In: Proceedings of the 15th Annual International Conference on Theory and Application of Cryptographic Techniques. pp. 354-371. EUROCRYPT'96, SpringerVerlag, Berlin, Heidelberg (1996)
15) Ibrahim, M., Ali, I., Ibrahim, I., El-sawi, A.: "*A robust threshold elliptic curve digital signature providing a new verifiable secret sharing scheme*". In: Circuits and Systems, 2003 IEEE 46th Midwest Symposium on. vol. 1, pp. 276-280 (2003)
16) Johnson, D., Menezes, A., Vanstone, S.: "*The elliptic curve digital signature algorithm (ecdsa)*". International Journal of Information Security 1(1), 36-63 (2001)
17) Chakraborty, Kalyan & Mehta, Jay (2011) "A Stamped Blind Signature Scheme based on Elliptic Curve Discrete Logarithm Problem" (http://ijns.femto.com.tw/contents/ijns-v14-n6/ijns-2012-v14-n6-p316-319.pdf).
18) Kapoor, Vivek, Vivek Sonny Abraham, and Ramesh Singh. "*Elliptic Curve Cryptography*." Ubiquity 2008, no. May (2008): 1-8.
19) Knuth, D. E. (1997), *"The Art of Computer Programming, II: Seminumerical Algorithms"* (3rd ed.), Addison-Wesley, p. 505.
20) Koblitz, N. "An Elliptic Curve Implementation of the Finite Field Digital Signature Algorithm" in Advances in Cryptology—Crypto '98. Lecture Notes in Computer Science, vol. 1462, pp. 327-337, 1998, Springer-Verlag.
21) Liu, C. L. (1968), "Introduction to Combinatorial Mathematics", New York: McGraw-Hill.
22) National Institute of Standards and Technology: FIPS PUB 186-4: *"Digital Signature Standard"* (DSS) (2003)
23) Pedersen, T.: *"Non-interactive and information-theoretic secure verifiable secret sharing"*. In: Feigenbaum, J. (ed.) Advances in Cryptology—CRYPTO '91, LNCS, vol. 576, pp. 129-140. Springer (1992)
24) Rabin T. & Ben-Or. M. (1989) "Verifiable secret sharing and multiparty protocols with honest majority". In Proc. 21st ACM Symposium on Theory of Computing, pages 73-85, 1989.
25) Shamir, Adi (1979), *"How to share a secret"*, Communications of the ACM, 22 (11): Pp. 612-613
26) Wright, C. & Savanah, S. (2016) "Determining a common secret for two Blockchain nodes for the secure exchange of information" "application Ser. No. 15/087, 315". 2016: n. pag. UK

The invention claimed is:

1. A method of obtaining digitally signed data, the method comprising:
   sending first data from at least one of a plurality of first participants to at least one second participant,
   wherein said first data is a blinded version of second data, wherein said second data is accessible to at least one said first participant, and wherein said second data is inaccessible to said at least one second participant,
   wherein said first data is generated by means of shares of said first data such that said first data is accessible by means of a threshold number of said shares and is inaccessible to less than said threshold number of shares, each share of said first data including shares of a plurality of first secret values shared among said plurality of said first participants;

receiving, from at least one said second participant, a digital signature of said first data; and processing said digital signature of said first data, by a plurality of said first participants, to provide, using a calculation having said digital signature of said first data as an input, shares of a digital signature of said second data, wherein said digital signature of said second data is accessible by means of a threshold number of said shares of said digital signature of said second data and is inaccessible to less than said threshold number of shares of said digital signature of said second data, and wherein each share of said digital signature of said second data includes shares of a plurality of said first secret values.

2. The method according to claim 1, wherein said shares of said plurality of first secret values are shared among said plurality of said first participants by means of joint random secret sharing (JRSS).

3. The method according to claim 1, wherein each share of said digital signature of said second data includes at least one first masking share, shared among said plurality of first participants by means of joint zero secret sharing (JZSS).

4. The method according to claim 1, wherein each share of said first data includes at least one second masking share, shared among said plurality of first participants by means of joint zero secret sharing (JZSS).

5. The method according to claim 1, wherein the digital signature of the first data is generated by means of shares of said digital signature of said first data, shared among a plurality of said second participants, wherein said digital signature of said first data is accessible by means of a threshold number of said shares and is inaccessible to less than said threshold number of said shares.

6. The method according to claim 5, wherein each share of said digital signature of said first data includes shares of a plurality of second secret values, shared among a plurality of said second participants by means of joint random secret sharing (JRSS).

7. The method according to claim 6, wherein each share of said digital signature of said first data includes at least one third masking share, shared among said plurality of said second participants by means of joint zero secret sharing (JZSS).

8. The method according to claim 6, further comprising receiving, from at least one said second participant, third data based on said second secret values.

9. The method according to claim 1, wherein the second data is a message.

10. The method according to claim 1, wherein the second data is a hash value of a message.

11. The method according to claim 1, wherein the first data is a blockchain transaction.

12. The method according to claim 1, wherein at least one said digital signature is based on a cryptography system having a homomorphic property.

13. The method according to claim 12, wherein at least one said digital signature is based on an elliptic curve cryptography system.

14. A computer-implemented system for obtaining digitally signed data comprising:

a processor; and memory including executable instructions that, as a result of execution by the processor, cause the computer-implemented system to perform a method of:

sending first data from at least one of a plurality of first participants to at least one second participant, wherein said first data is a blinded version of second data, wherein said second data is accessible to at least one said first participant, and wherein said second data is inaccessible to said at least one second participant, wherein said first data is generated by means of shares of said first data such that said first data is accessible by means of a threshold number of said shares and is inaccessible to less than said threshold number of shares, each share of said first data including shares of a plurality of first secret values shared among said plurality of said first participants;

receiving, from at least one said second participant, a digital signature of said first data; and processing said digital signature of said first data, by a plurality of said first participants, to provide, using a calculation having said digital signature of said first data as an input, shares of a digital signature of said second data, wherein said digital signature of said second data is accessible by means of a threshold number of said shares of said digital signature of said second data and is inaccessible to less than said threshold number of shares of said digital signature of said second data, and wherein each share of said digital signature of said second data includes shares of a plurality of said first secret values.

15. The computer-implemented system according to claim 14, wherein said shares of said plurality of first secret values are shared among said plurality of said first participants by means of joint random secret sharing (JRSS).

16. A non-transitory computer-readable storage medium for obtaining digitally signed data, having stored thereon executable instructions that, as a result of being executed by a processor of a computer system, cause the computer system to at least perform a method of:

sending first data from at least one of a plurality of first participants to at least one second participant, wherein said first data is a blinded version of second data, wherein said second data is accessible to at least one said first participant, and wherein said second data is inaccessible to said at least one second participant, wherein said first data is generated by means of shares of said first data such that said first data is accessible by means of a threshold number of said shares and is inaccessible to less than said threshold number of shares, each share of said first data including shares of a plurality of first secret values shared among said plurality of said first participants;

receiving, from at least one said second participant, a digital signature of said first data; and processing said digital signature of said first data, by a plurality of said first participants, to provide, using a calculation having said digital signature of said first data as an input, shares of a digital signature of said second data, wherein said digital signature of said second data is accessible by means of a threshold number of said shares of said digital signature of said second data and is inaccessible to less than said threshold number of shares of said digital signature of said second data, and wherein each share of said digital signature of said second data includes shares of a plurality of said first secret values.

17. The non-transitory computer-readable storage medium according to claim 16, wherein said shares of said plurality of first secret values are shared among said plurality of said first participants by means of joint random secret sharing (JRSS).

* * * * *